United States Patent [19]
Ishii et al.

[11] Patent Number: 5,874,706
[45] Date of Patent: Feb. 23, 1999

[54] MICROWAVE PLASMA PROCESSING APPARATUS USING A HYBRID MICROWAVE HAVING TWO DIFFERENT MODES OF OSCILLATION OR BRANCHED MICROWAVES FORMING A CONCENTRIC ELECTRIC FIELD

[75] Inventors: Nobuo Ishii, Mino; Kibatsu Shinohara, Yokohama, both of Japan

[73] Assignees: Tokyo Electron Limited, Tokyo; Nihon Koshuha Co., Ltd., Yokohama, both of Japan

[21] Appl. No.: 936,820

[22] Filed: Sep. 24, 1997

[30] Foreign Application Priority Data

Sep. 26, 1996 [JP] Japan ................................. 8-275392
Sep. 26, 1996 [JP] Japan ................................. 8-275393

[51] Int. Cl.$^6$ .................................................. B23K 10/00
[52] U.S. Cl. ............................ 219/121.43; 219/121.52; 156/345; 118/723 MN; 204/298.38
[58] Field of Search ........................ 219/121.43, 121.4, 219/121.41, 52; 204/298.37, 298.36; 156/345, 646.1, 643.1; 118/723 MN

[56] References Cited

U.S. PATENT DOCUMENTS

| | | | |
|---|---|---|---|
| 3,810,248 | 5/1974 | Risman et al. | 219/10.55 B |
| 4,276,462 | 6/1981 | Risman | 219/10.55 A |
| 4,323,745 | 4/1982 | Berggren | 219/10.55 A |
| 4,631,380 | 12/1986 | Tran | 219/10.55 A |
| 4,777,336 | 10/1988 | Asmussen | 219/10.55 A |
| 4,866,346 | 9/1989 | Gaudreau et al. | |
| 5,153,406 | 10/1992 | Smith | |
| 5,279,669 | 1/1994 | Lee | |
| 5,302,803 | 4/1994 | Stevens et al. | 219/121.43 |
| 5,449,889 | 9/1995 | Samardzija | 219/695 |
| 5,632,921 | 5/1997 | Risman et al. | 219/750 |

FOREIGN PATENT DOCUMENTS

| | | |
|---|---|---|
| 0632678 | 1/1995 | European Pat. Off. |
| 2-170530 | 7/1990 | Japan |
| 5-74592 | 3/1993 | Japan |

Primary Examiner—Mark H. Paschall
Attorney, Agent, or Firm—Oblon, Spivak, McClelland, Maier & Neustadt, P.C.

[57] ABSTRACT

An ECR type plasma processing apparatus including an airtight processing chamber and a work table for supporting a semiconductor wafer thereon disposed in the processing chamber. The interior of the processing chamber is exhausted to a vacuum by an exhaust system and an active gas such as $CF_4$ gas and an inert gas such as Ar gas are supplied into the processing chamber through nozzles. Further, a magnet is disposed around the processing chamber to generate a magnetic field perpendicular to the upper surface of the wafer and a microwave transmitting window is disposed in the ceiling of the processing chamber. Also, a microwave generated by a microwave generator is introduced into the transmitting window through a rectangular waveguide, a mode converter, and a tapered waveguide. The microwave is transmitted through the rectangular waveguide in the $TE_{10}$ mode, is converted into a hybrid wave of two mode waves, i.e., a $TM_{01}$-mode wave and a $TE_{11}$-mode wave, by the mode converter, and is transmitted to the tapered waveguide.

22 Claims, 9 Drawing Sheets

MICROWAVE PLASMA PROCESSING APPARATUS USING A HYBRID MICROWAVE HAVING TWO DIFFERENT MODES OF OSCILLATION OR BRANCHED MICROWAVES FORMING A CONCENTRIC ELECTRIC FIELD

BACKGROUND OF THE INVENTION

The present invention relates to a plasma processing apparatus for generating a plasma by utilizing the energy of a microwave and, more particularly, to an electron cyclotron resonance (ECR) type plasma processing apparatus.

In the manufacturing process of a semiconductor device, a plasma processing apparatus is used for film formation, etching, ashing, and the like. As a plasma processing apparatus, an ECR type apparatus which generates a plasma by utilizing a microwave and a magnetic field generated by an annular coil is known. A plasma processing apparatus of this type can stably generate a plasma even in a high vacuum state having a comparatively low pressure of about 0.1 Torr to several 10 mTorr.

Jpn. Pat. Appln. KOKAI Publication No. 3-17273 discloses an example of an ECR type plasma processing apparatus. In the apparatus of this reference, a means for generating a magnetic field is arranged in a plasma generation chamber, and a waveguide for introducing a microwave is connected to the plasma generation chamber. Electrons are excited by electron cyclotron resonance caused by the cooperation of the microwave and magnetic field, and the process gas is converted into a high-density plasma.

Figure 16:
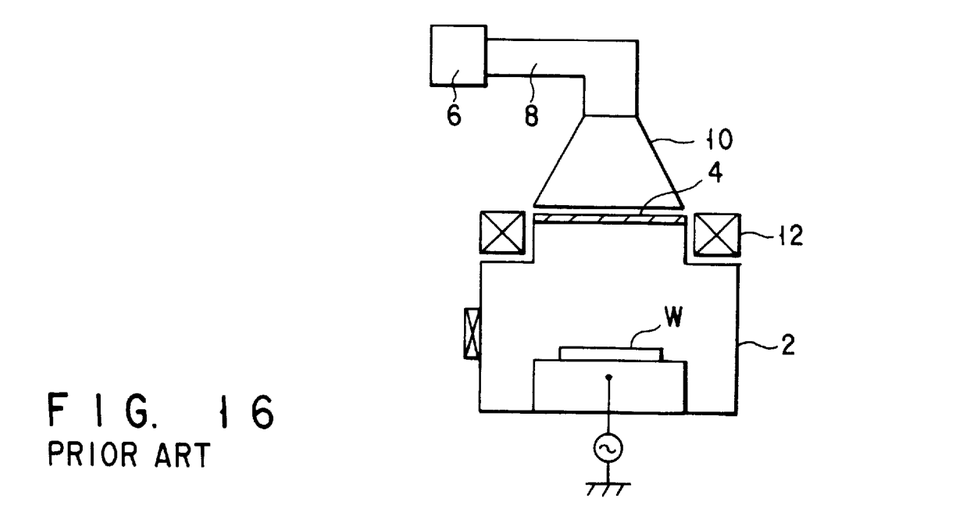
FIG. 16 is a schematic view showing the arrangement of a conventional ECR type plasma processing apparatus.

FIG. 16 shows the schematic arrangement of an ECR type plasma processing apparatus. A microwave inlet window 4 is formed in the ceiling portion of a processing chamber 2. A microwave generated by a microwave generator 6 is transmitted to the microwave inlet window 4 through, e.g., a rectangular waveguide 8 and a conical waveguide 10. The microwave introduced from the microwave inlet window 4 into the processing chamber 2 cooperates with a vertical magnetic field generated by a magnet 12 arranged on the outer side of the upper portion of the processing chamber 2 to cause electron cyclotron resonance, thereby converting the process gas into a high-density plasma.

The microwave is transmitted through the waveguide 8 in the $TE_{10}$ mode, is converted into the $TE_{11}$ mode when entering the conical waveguide 10, and is introduced into the processing chamber 2. When the $TE_{11}$-mode microwave is observed in relation to a target object, e.g., a semiconductor wafer w, its field density is high at the central portion of the wafer, and is gradually decreased toward the peripheral portion of the wafer. Since the progress of plasma processing (e.g., the etching rate or film formation rate) on the wafer is substantially proportional to such a field density distribution, the non-uniformity in field density distribution degrades the planar uniformity of plasma processing. In particular, as the wafer size increases from 8 inches to 12 inches, it becomes more and more difficult to increase the uniformity in plasma density. Therefore, strong demand has arisen for solving the above problem.

Jpn. Pat. Appln. KOKAI No. 2-170530 discloses a technique for solving this problem. According to this reference, a plurality of independent microwave generators are disposed, and microwaves from these microwave generators are separately introduced into the processing chamber. In this case, however, because, e.g., the phases of the microwaves from the respective generators are not aligned with each other, the planar uniformity in plasma density and film thickness cannot be increased very much even though the plurality of generators are disposed. Due to the presence of the plurality of microwave generators, a large increase in apparatus cost cannot be avoided.

Wave Propagation and Plasma Uniformity in an Electron Cyclotron Resonance Plasma Etch Reactor in Jpn. J. Appl. Phys. Vol. 32 (1993) pp. 3007–3012 discloses still another example of an ECR type plasma processing apparatus. In the apparatus disclosed in this reference, after microwaves are passed through two couplers separately disposed, they are combined again. The microwaves are transmitted in the $TE_{11}$ mode and the $TM_{01}$ mode in the respective couplers. In this case, however, since the couplers, a $\lambda/4$ polarizer, and the like are used, the structure of the apparatus is rather complicated.

BRIEF SUMMARY OF THE INVENTION

It is an object of the present invention to provide a plasma processing apparatus in which the planar uniformity in plasma processing for a target object is improved with a simple structure.

According to a first aspect of the present invention, there is provided an apparatus for processing a target object by using a plasma, comprising:

an airtight processing chamber;

a work table for supporting the target object disposed in the processing chamber;

an exhaust for exhausting the processing chamber and setting the processing chamber at a vacuum;

a process gas supply for supplying a process gas into the processing chamber; and a microwave supply for supplying into the processing chamber a microwave for exciting the process gas to convert the process gas into a plasma, the microwave supply having a first waveguide connected to a microwave generator, a second waveguide open to face the processing chamber, and a mode converter for connecting the first and second waveguides so as to change an oscillation mode and transmitting direction of the microwave, and the mode converter converting the microwave such that the microwave transmitted through the second waveguide becomes a hybrid wave having two mode waves of oscillation modes that are different from each other.

According to a second aspect of the present invention, there is provided an apparatus for processing a target object by using a plasma, comprising:

an airtight processing chamber;

a work table for supporting the target object disposed in the processing chamber;

an exhaust for exhausting the processing chamber and setting the processing chamber at a vacuum;

a process gas supply for supplying a process gas into the processing chamber; and a microwave supply for supplying into the processing chamber a microwave for exciting the process gas to convert the process gas into a plasma, the microwave supply having a main waveguide connected to a microwave generator, a flat antenna disposed to oppose the processing chamber and having a plurality of openings disposed concentrically, and a plurality of branched waveguides for connecting the main waveguide and the openings of the flat antenna to each other, and the microwave being transmitted from the main waveguide to the openings of the flat antenna while being branched through the branched waveguides, and introduced into the processing chamber from the openings such that respective portions of branched microwaves are synthesized, thereby forming a concentric electric field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
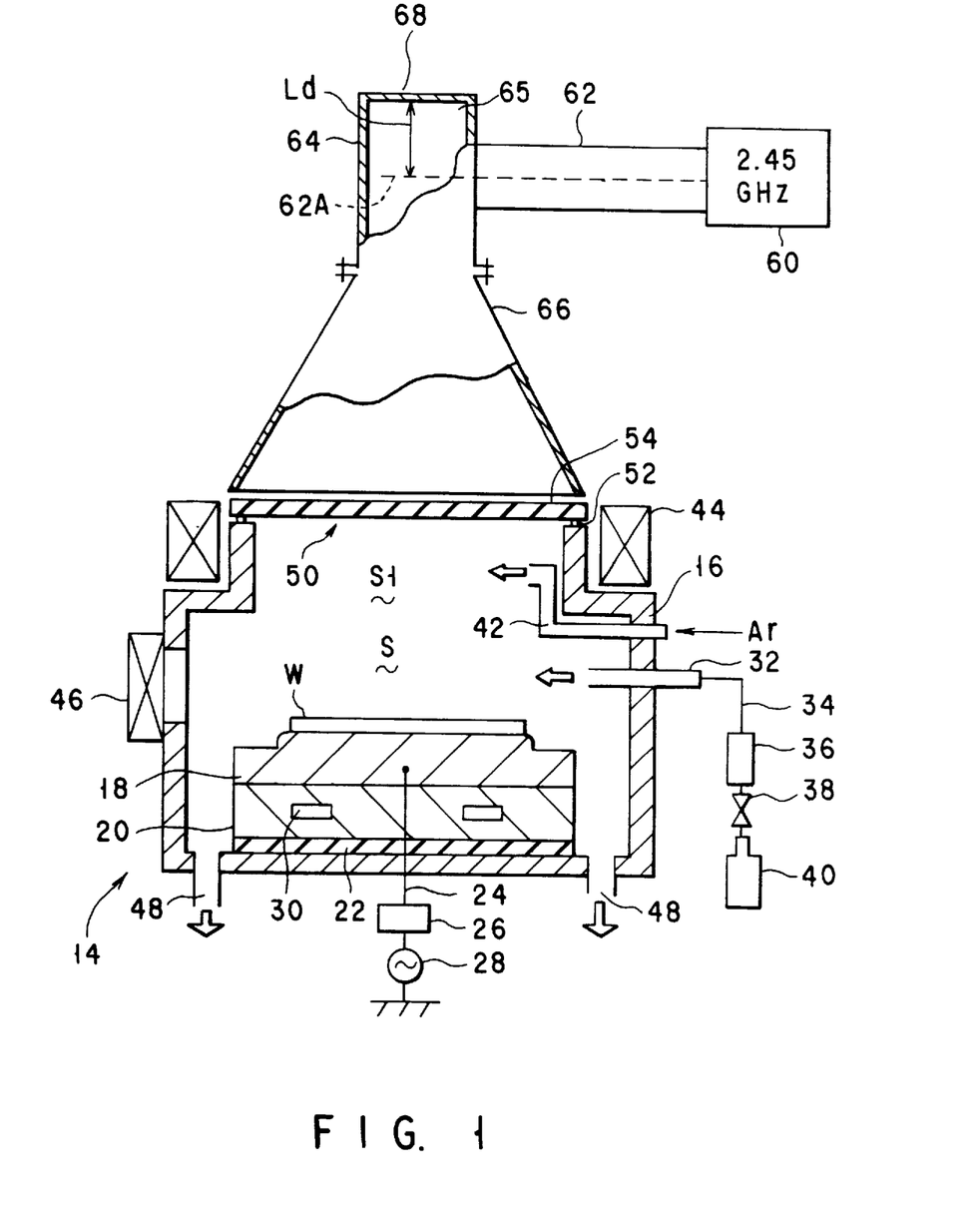
FIG. 1 is a view showing the arrangement of a plasma processing apparatus according to an embodiment of the present invention.

FIG. 1 shows the arrangement of a plasma processing apparatus according to an embodiment of the present invention. The plasma processing apparatus shown in FIG. 1 is constituted as an apparatus for plasma-etching a semiconductor wafer. A plasma etching apparatus 14 has a processing chamber 16 whose side wall and bottom portion, for example, are made of a conductor such as aluminum. The processing chamber 16 is formed entirely cylindrically while the diameter of its upper portion is reduced stepwise, and forms an airtight processing space S in it. The upper portion of the processing space S forms a plasma generating space S1.

A work table 18 for placing, e.g., a semiconductor wafer W, as a target object thereon is arranged in the processing chamber 16. The work table 18 has a substantially cylindrical shape and is made of, e.g., aluminum, whose surface is anodized. A projecting portion having a horizontal, flat surface is formed at the central portion of the work table 18 to place the semiconductor wafer W thereon. The work table 18 is supported by a cylindrical support table 20 which is made of aluminum or the like similarly to the work table 18. The support table 20 is mounted on the bottom portion of the processing chamber 16 through an insulating member 22.

An electrostatic chuck and a clamp mechanism (not shown) for attracting and holding the wafer are disposed on the upper surface of the work table 18. The work table 18 is connected to, e.g., a 13.56-MHz biasing RF power supply 28 with a power feed line 24 through a matching box 26.

A cooling jacket 30 in which cooling water or the like flows is disposed in the support table 20 that supports the work table 18, in order to cool the wafer during plasma processing.

In order to introduce an etching active gas into the processing chamber 16, an active gas supply nozzle 32 formed of, e.g., a quartz pipe, is connected to the processing chamber 16. The nozzle 32 is connected to an active gas source 40 with a gas supply line 34 through a massflow controller 36 and an opening/closing valve 38. As the active gas, a single gas, e.g., $CF_3$ gas, $CHF_3$ gas, $CF_4$ gas, or $C_4F_8$ gas, or a gas mixture obtained by mixing one of these gases with hydrogen gas can be used.

In order to introduce an inert gas into the processing chamber 16, an inert gas supply nozzle 42 formed of, e.g., a quartz pipe, is connected to the processing chamber 16. An inert gas such as argon (Ar) is supplied from the inert gas supply nozzle 42 under flow rate control. The inert gas is supplied to a space above the space where active gas is supplied, i.e., is directly supplied into the plasma generating space S1.

An ECR annular magnet 44 is disposed on the outer side of the stepped portion of the processing chamber 16. The magnet 44 generates a magnetic field for ECR generation in the plasma generating space S1. The line of magnetic force of the magnetic field is set to be substantially perpendicular to the upper surface of the wafer on the work table 18, i.e., to the target surface.

A gate valve 46 is disposed on the side wall of the processing chamber 16 to open/close when loading/unloading the wafer into/from the processing chamber 16.

Exhaust ports 48 connected to a vacuum pump (not shown) are formed at the bottom portion of the processing chamber 16. The interior of the processing chamber 16 can be exhausted to a predetermined pressure as required by the vacuum pump.

A microwave transmitting window 54 made of a dielectric, e.g., quartz, is formed in the ceiling portion of the processing chamber 16 in order to introduce the microwave into the processing chamber 16. The transmitting window 54 is hermetically attached to an opening 50 with a sealing member 52, e.g., an O-ring. The opening 50 is formed in the ceiling of the processing chamber 16 and has substantially the same size as the diameter of the work table 18 or is slightly larger than that.

In order to supply a microwave to the transmitting window 54, a microwave generator 60 for generating, e.g., a 2.45-GHz microwave, is used. The microwave generated by the microwave generator 60 is transmitted to the processing chamber 16 through a rectangular waveguide 62 and a tapered cylindrical waveguide 66 that are connected to each other through a mode converter 64 to form an angle of 90°. These members 62, 64, and 66 form a waveguide defined by a conductor. More specifically, the microwave generated by the microwave generator 60 is first transmitted through the rectangular waveguide 62, is converted by the mode converter 64 such that its oscillation mode and transmitting direction are converted, and is then transmitted through the waveguide 66. The microwave that has been transmitted through the waveguide 66 is introduced into the processing chamber 16 through the transmitting window 54. The waveguide 66 is not limited to a conical, tapered waveguide, but can be a cylindrical waveguide or a waveguide having another sectional shape.

The mode converter 64 performs a setting operation such that the microwave transmitted through the waveguide 66 becomes a hybrid wave having two mode waves whose oscillation modes are different from each other. In this embodiment, the microwave transmitted through the rectangular waveguide 62 in the $TE_{10}$ mode is converted by the mode converter 64 into a hybrid wave of two mode waves, i.e., a $TM_{01}$-mode wave and a $TE_{11}$-mode wave.

Figure 2:
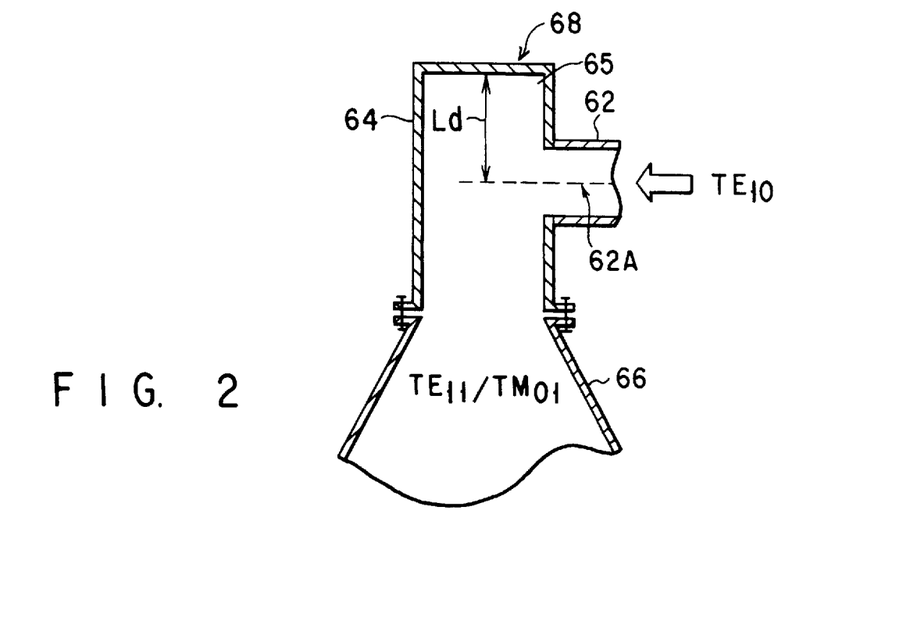
FIG. 2 is an enlarged sectional view of the mode converter of the apparatus shown in FIG. 1.

More specifically, as shown in FIG. 2, the mode converter 64 has a recessed portion 65 which opens to face the tapered waveguide 66 through an extension line 62A at the center of the rectangular waveguide 62 and which is disposed to be concentric with the tapered waveguide 66. The recessed portion 65 is defined by the wall surface made of a conductor, and its inner end surface serves as a mode converting plate 68 which is conductive. A distance Ld from the extension line 62A at the center of the rectangular waveguide 62 to the mode converting plate 68 is set to satisfy $\lambda a/4 < Ld < \lambda b/4$, preferably $[\lambda a/4+(\lambda b-\lambda a)/16] < Ld < [\lambda b/4-(\lambda b-\lambda a)/16]$, and is more preferably set at about $(\lambda a+\lambda b)/8$, with respect to the respective wavelengths $\lambda a$ and $\lambda b$ ($\lambda a < \lambda b$) of the two mode waves (the $TM_{01}$-mode wave and the $TE_{11}$-mode wave in this embodiment) of the hybrid wave.

The microwave conversion modes of the mode converter 64 depend on the depth of the recessed portion 65 of the mode converter 64, i.e., the distance Ld from the extension line 62A at the center of the rectangular waveguide 62 to the mode converting plate 68. When the distance Ld, i.e., the depth Ld of the recessed portion 65, is approximate to $\lambda/4$ a certain oscillation mode, this oscillation mode can be obtained by the mode converter 64. Accordingly, if the distance, i.e., the depth Ld, is set to satisfy the relationship $\lambda a/4 < Ld < \lambda b/4$, preferably $[\lambda a/4+(\lambda b-\lambda a)/16] < Ld < [\lambda/4-(\lambda b-\lambda a)/16]$, and is more preferably set at about $(\lambda a+\lambda b)/8$, with respect to the respective wavelengths $\lambda a$ and $\lambda b$ of the two oscillation modes, a hybrid wave of the two oscillation modes can be obtained.

At the connecting portion from the rectangular waveguide 62 to the tapered waveguide 66, there is a reactance which can be a cause of reflecting a microwave. Assume that the depth of the recessed portion 65, i.e., the distance Ld (position of the mode converting plate 68), is set at substantially $\lambda g/4$ with respect to the wavelength $\lambda g$ of the mode wave of a certain microwave. In this case, a microwave reflected by the mode converting plate 68 functions to cancel the reflection due to the above-described reactance, thereby bringing about a parallel resonant cavity relative to the mode wave. As a result, the mode wave is transmitted to the tapered waveguide 66.

From this point of view, conventionally, the distance Ld is set at a length of about ¼ the desired oscillation mode or the sum of about ¼ and an integer multiple of about ½ the desired oscillation mode.

In contrast to this, according to the present invention, the distance Ld is intentionally set such that the two mode waves are transmitted to the waveguide 66, as described above. In this embodiment, the distance Ld is set at ¼ the length between the $TE_{11}$-mode wavelength $\lambda a$ and the $TM_{01}$-mode wavelength $\lambda b$. Since the $TE_{11}$-mode wavelength $\lambda a$ is shorter than the $TM_{01}$-mode wavelength $\lambda b$, $\lambda a/4 < Ld < \lambda b/4$ is obtained. In practice, substantially the intermediate value of $\lambda a/4$ and $\lambda b/4$, i.e., about $(\lambda a+\lambda b)/8$ is set as the distance Ld. Due to the resonance of the wave reflected by the mode converting plate 68, the microwave is transmitted into the waveguide 66 in a mixed state of the $TM_{01}$-mode wave and the $TE_{11}$-mode wave.

The operation of the plasma etching apparatus 14 having the above arrangement will now be described.

The semiconductor wafer W is transferred into the processing chamber 16 by a transfer arm through the gate valve 46. Lifter pins (not shown) are vertically moved to place the wafer W on the upper surface of the work table 18.

While the interior of the processing chamber 16 is maintained at a predetermined process pressure, e.g., within a range of 0.1 mTorr to several 10 mTorr, an active gas such as $CF_4$ gas and an inert gas such as Ar gas are supplied from the nozzles 32 and 42 under flow rate control. The Ar gas may not be supplied. The microwave generated by the microwave generator 60 is introduced into the plasma generating space S1 and the processing space S through the rectangular waveguide 62, the mode converter 64, and the tapered waveguide 66. An electric field is formed in the spaces S1 and S in this manner to generate a plasma, thereby performing etching. At this time, an electron cyclotron resonance phenomenon is caused by the magnetic field of the magnet 44 arranged on the outer side of the processing chamber 16, and the plasma density increases accordingly.

The microwave of, e.g., 2.45 GHz, generated by the microwave generator 60 is transmitted through the rectangular waveguide 62 in the $TE_{10}$ mode, is converted into a hybrid wave of the $TM_{01}$-mode wave and the $TE_{11}$-mode wave by the mode converter 64, and is transmitted into the tapered waveguide 66. More specifically, since the distance Ld between the extension line 62A at the center of the rectangular waveguide 62 and the mode converting plate 68 of the mode converter 64 is set at ¼ substantially the intermediate value of the $TM_{01}$-mode wavelength $\lambda a$ and the $TE_{11}$-mode wavelength $\lambda b$, the hybrid wave of the $TM_{01}$-mode wave and the $TE_{11}$-mode wave is transmitted through the waveguide 66 and introduced into the processing chamber 16.

Figures 3A, 3B:
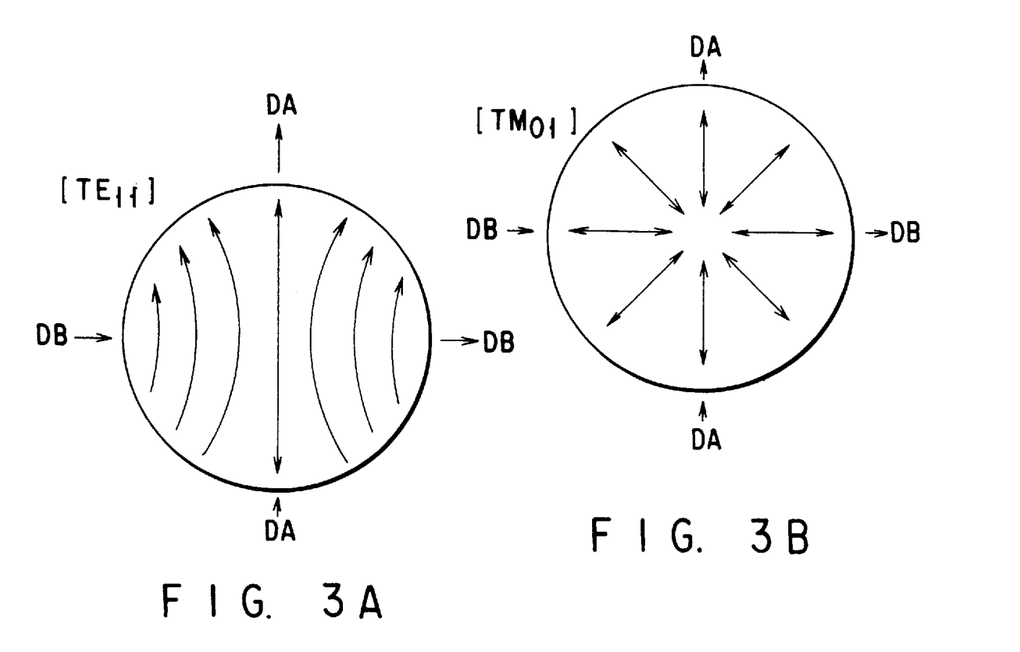
FIGS. 3A and 3B show the two oscillation modes of the microwave in the apparatus shown in FIG. 1.

FIG. 3A shows the electric field state of the $TE_{11}$ mode in the horizontal plane, and FIG. 3B shows the electric field state of the $TM_{01}$ mode in the horizontal plane. As shown in FIG. 3A, in the $TE_{11}$ made, a strong field is formed in one direction, i.e., in the vertical direction in FIG. 3A. Nearer to the side portions, the lower the field strength. In contrast to this, in the $TM_{01}$ mode, as shown in FIG. 3B, an electric field is generated radially from the center, and its strength is dropped at the central portion.

Figure 4A:
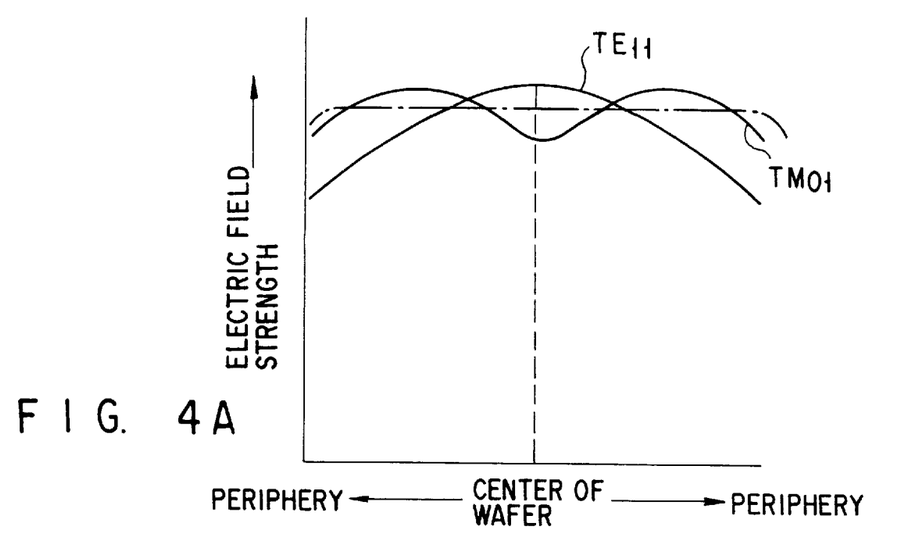
FIGS. 4A and 4B are graphs each showing the distribution of the synthetic field of the two oscillation modes of FIGS. 3A and 3B.
Figure 4B:
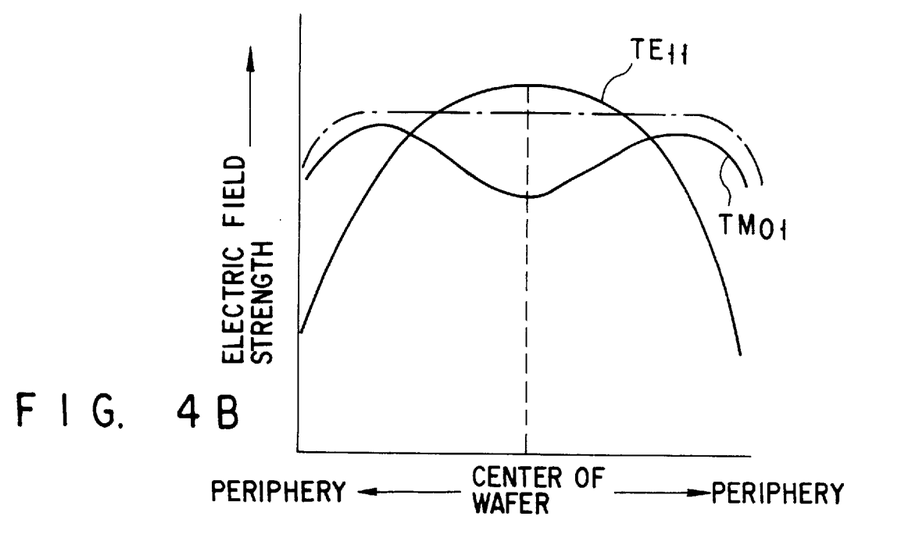

When these two oscillation modes are synthesized, the obtained field distribution becomes as shown in FIGS. 4A and 4B. FIG. 4A shows a state of electric field distribution obtained along a direction DA of FIGS. 3A and 3B, and FIG. 4B shows a state of electric field distribution obtained along a direction DB of FIGS. 3A and 3B. In FIGS. 4A and 4B, the chain line indicates the synthetic field of the two oscillation modes.

Although the electric field strength of the $TE_{11}$-mode has very small drops at its two sides in FIG. 4A, it has rather sharp drops at the two sides of the graph of FIG. 4B. In contrast to this, the electric field strength of the $TM_{01}$-mode shows a same tendency in FIGS. 4A and 4B. Although this electric field strength has a small drop at the central portion of the wafer, it has two peaks on its two side portions corresponding to the peripheral portion of the wafer. Therefore, the synthetic field of the two modes operates to compensate for the drops of the respective electric fields. As a result, a flat field distribution, i.e., an electric field distribution substantially uniform in the planar direction, can be obtained.

In this manner, an electric field substantially uniform in the planar direction can be obtained in the plasma generating space S1 and processing space S of the processing chamber 16. Hence, the plasma distribution can be uniform, thereby improving the planar uniformity of plasma processing.

According to the plasma etching apparatus 14 shown in FIG. 1, a high-density plasma substantially uniform on the entire surface of the wafer can be formed, and plasma etching processing having a high planar uniformity can be performed. When this advantage is applied to an apparatus that performs sputtering film formation by using a plasma, plasma film formation having a high planar uniformity can be similarly performed.

In the apparatus shown in FIG. 1, the distance Ld between the extension line 62A at the center of the rectangular waveguide 62 and the mode converting plate 68 is set at ¼ substantially the intermediate value of the wavelengths λa and λb of the two oscillation modes. However, depending on the process conditions, the distance Ld can be set to be nearer either one oscillation mode, as described above.

Figure 5:
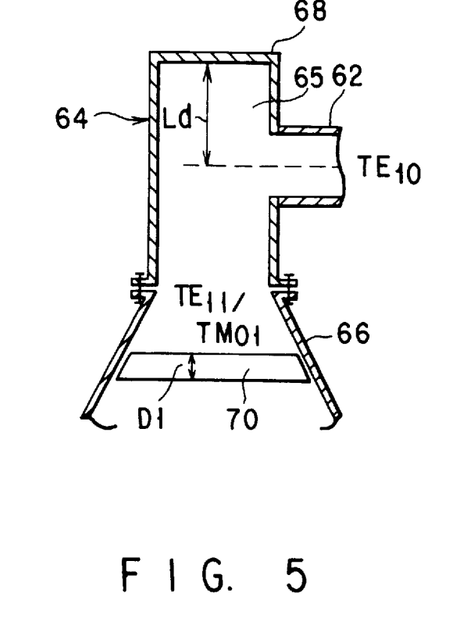
FIG. 5 is a view showing a modification of a tapered waveguide in which a polarizing member is disposed.
Figure 6A:
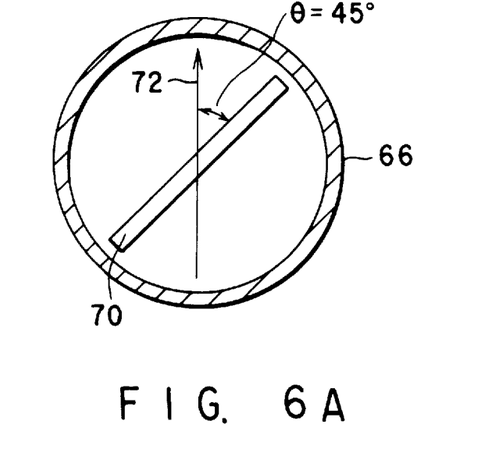
FIGS. 6A and 6B are views for explaining the arrangement and operation of the polarizing member shown in FIG. 5.

As shown in FIG. 5, a polarizing member 70 for circularly polarizing the $TE_{11}$-mode wave can be disposed in the mode converting plate 68 or tapered waveguide 66. In FIG. 5, the polarizing member 70 is disposed midway along the tapered waveguide 66. FIG. 6A is a sectional view of the tapered waveguide 66.

The polarizing member 70 is formed of an elongated hexahedral molded body made of a dielectric, e.g., $Al_2O_3$, AlN, or the like. As shown in FIG. 6A, the polarizing member 70 is arranged such that its longitudinal direction forms an angle θ=45° with respect to a direction 72 along which the electric field of the $TE_{11}$-mode is the strongest. A thickness D1 of the polarizing member 70 in the microwave transmitting direction is set such that a phase difference of ¼ the $TE_{11}$-mode wavelength λa in the tube is caused.

Figure 6B:
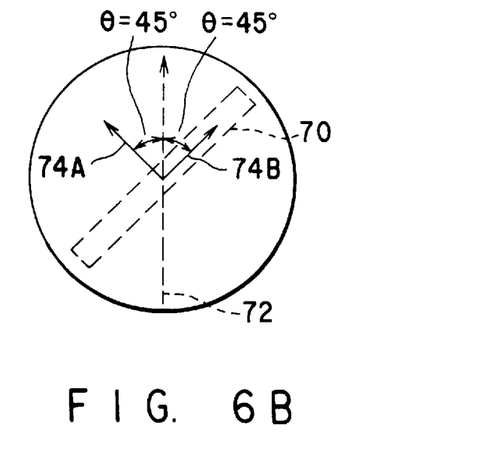

When the $TE_{11}$-mode wave passes through the polarizing member 70, the electric field in the direction along which it is the strongest is divided into an electric field component 74A passing through the vacuum or the air and an electric field component 74B perpendicular to the field component 74A and oscillating in the longitudinal direction of the polarizing member 70, as shown in FIG. 6B. When passing through the polarizing member 70, a ¼ phase difference is present between the two components, and the $TE_{11}$-mode wave is circularly polarized. Accordingly, the uniformity in field distribution in the planar direction can be further improved when compared to a case not having a polarizing member 70.

Figure 7:
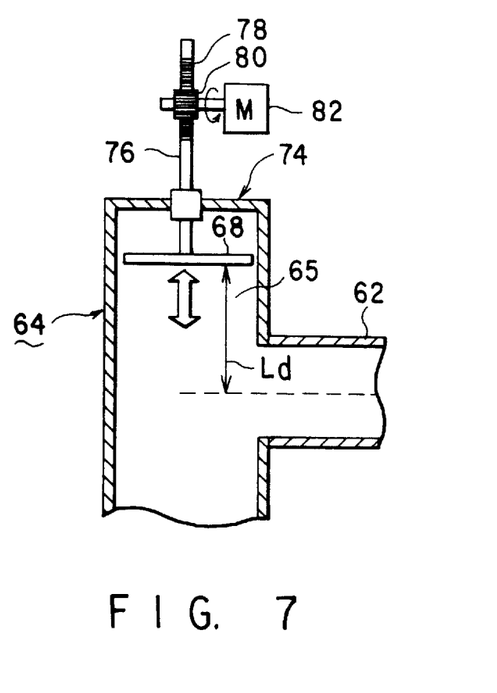
FIG. 7 shows a modification of a mode converter having a movable mode converting plate.

As shown in FIG. 7, the mode converting plate 68 of the mode converter 64 can be made movable. Referring to FIG. 7, the mode converting plate 68 made of a conductor is supported at the distal end of a slide rod 76 slidably extending through a casing ceiling portion 74. A pinion 80 engages with a rack 78 formed on the slide rod 76. When the pinion 80 is rotated by a drive motor 82, the position of the mode converting plate 68 is changed. In this manner, the depth of the recessed portion 65 of the mode converter 64, i.e., the distance Ld described above, can be adjusted. As a result, a mixed state of the two oscillation modes can be arbitrarily set, and various types of field distribution state can be set to match the types of the process and the like.

According to the embodiment of the present invention described with reference to FIGS. 1 to 7, the following effects can be obtained.

Since a mixed microwave of a plurality of oscillation modes is introduced into the processing chamber, an electric field having an excellent planar uniformity can be generated in the processing chamber, and the plasma density can be uniform over a wide area. Accordingly, the planar uniformity of plasma processing can be improved. If the polarizing member is disposed in the mode converter or the tapered waveguide to circularly polarize some oscillation mode wave, the planar uniformity of the electric field can be further improved. Furthermore, if the mode converting plate is positionally adjustable, the distribution state of a desired plasma density can be obtained to match the type of plasma processing.

Figure 8:
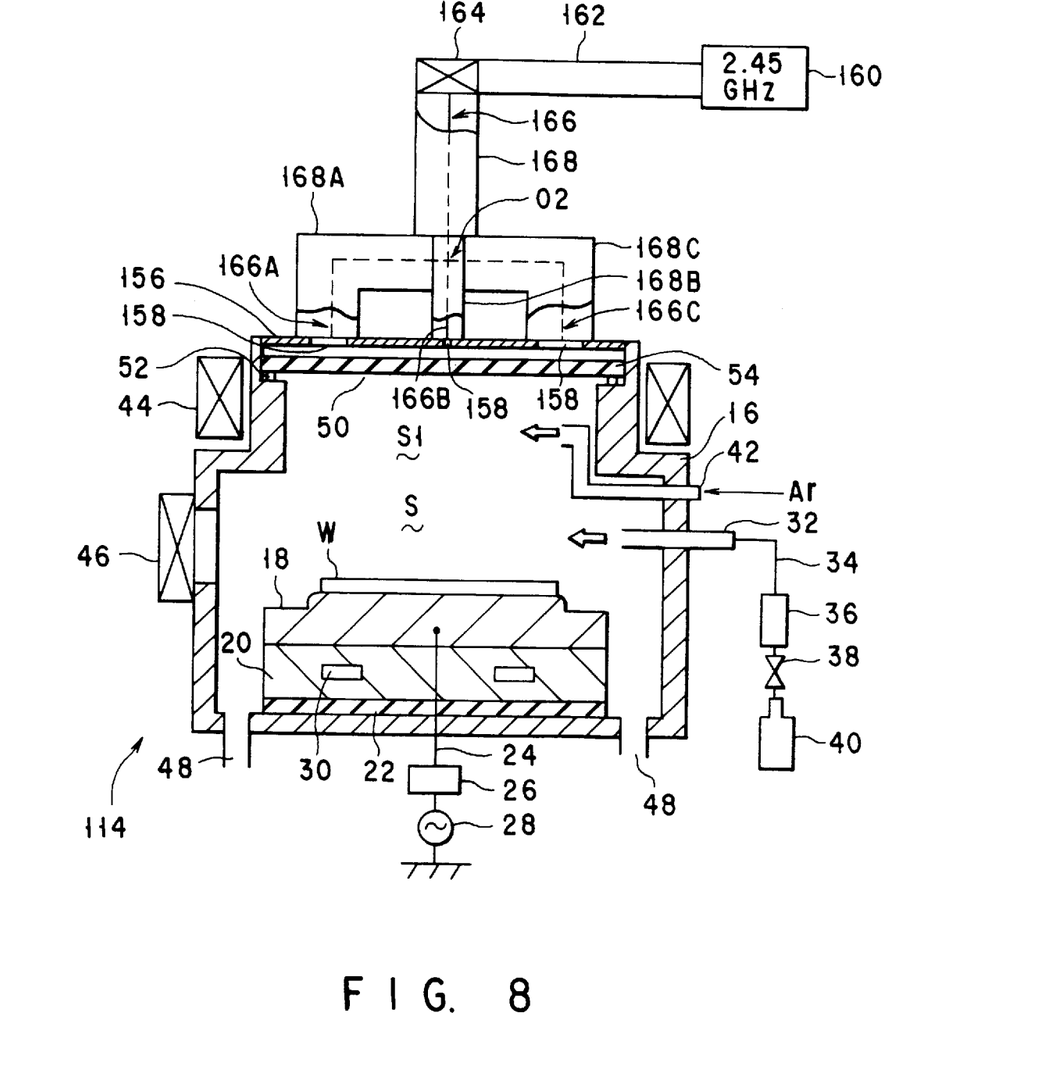
FIG. 8 is a view showing the arrangement of a plasma processing apparatus according to another embodiment of the present invention.

FIG. 8 shows the arrangement of a plasma processing apparatus according to another embodiment of the present invention. The plasma processing apparatus shown in FIG. 8 is constituted as an apparatus for plasma-etching a semiconductor wafer. A plasma etching apparatus 114 has a processing chamber 16 whose side wall and bottom portion, for example, are made of a conductor such as aluminum. The processing chamber 16 is entirely formed cylindrically while the diameter of its upper portion is reduced stepwise, and forms an airtight processing space S in it. The upper portion of the processing space S forms a plasma generating space S1.

A work table 18 for placing, e.g., a semiconductor wafer W, as a target object thereon is arranged in the processing chamber 16. The work table 18 has a substantially cylindrical shape and is made of, e.g., aluminum, whose surface is anodized. A projecting portion having a horizontal, flat surface is formed at the central portion of the work table 18 to place the semiconductor wafer W thereon. The work table 18 is supported by a cylindrical support table 20 which is made of aluminum or the like similarly to the work table 18. The support table 20 is mounted on the bottom portion of the processing chamber 16 through an insulating member 22.

An electrostatic chuck and a clamp mechanism (not shown) for attracting and holding the wafer are disposed on the upper surface of the work table 18. The work table 18 is connected to, e.g., a 13.56-MHz biasing RF power supply 28 with a power feed line 24 through a matching box 26.

A cooling jacket 30 in which cooling water or the like flows is disposed in the support table 20 that supports the work table 18, in order to cool the wafer during plasma processing.

In order to introduce an etching active gas into the processing chamber 16, an active gas supply nozzle 32 formed of, e.g., a quartz pipe, is connected to the processing chamber 16. The nozzle 32 is connected to an active gas source 40 with a gas supply line 34 through a massflow controller 36 and an opening/closing valve 38. As the active gas, a single gas, e.g., $CF_3$ gas, $CHF_3$ gas, $CF_4$ gas, or $C_4F_8$ gas, or a gas mixture obtained by mixing one of these gases with hydrogen gas can be used.

In order to introduce an inert gas into the processing chamber 16, an inert gas supply nozzle 42 formed of, e.g., a quartz pipe, is connected to the processing chamber 16. An inert gas such as argon (Ar) is supplied from the inert gas supply nozzle 42 under flow rate control. The inert gas is supplied to a space above the space where active gas is supplied, i.e., is directly supplied into the plasma generating space S1.

An ECR annular magnet 44 is disposed on the outer side of the stepped portion of the processing chamber 16. The magnet 44 generates a magnetic field for ECR generation in the plasma generating space S1. The line of magnetic force of the magnetic field is set to be substantially perpendicular to the upper surface of the wafer on the work table 18, i.e., to the target object surface.

A gate valve 46 is disposed on the side wall of the processing chamber 16 to open/close when loading/unloading the wafer into/from the processing chamber 16.

Exhaust ports 48 connected to a vacuum pump (not shown) are formed at the bottom portion of the processing chamber 16. The interior of the processing chamber 16 can be exhausted to a predetermined pressure as required by the vacuum pump.

A microwave transmitting window 54 made of a dielectric, e.g., quartz, is formed in the ceiling portion of the processing chamber 16 in order to introduce the microwave into the processing chamber 16. The transmitting window 54 is hermetically attached to an opening 50 with a sealing member 52, e.g., an O-ring. The opening 50 is formed in the ceiling of the processing chamber 16 and has substantially the same size as the diameter of the work table 18 or is slightly larger than that.

Figure 9:
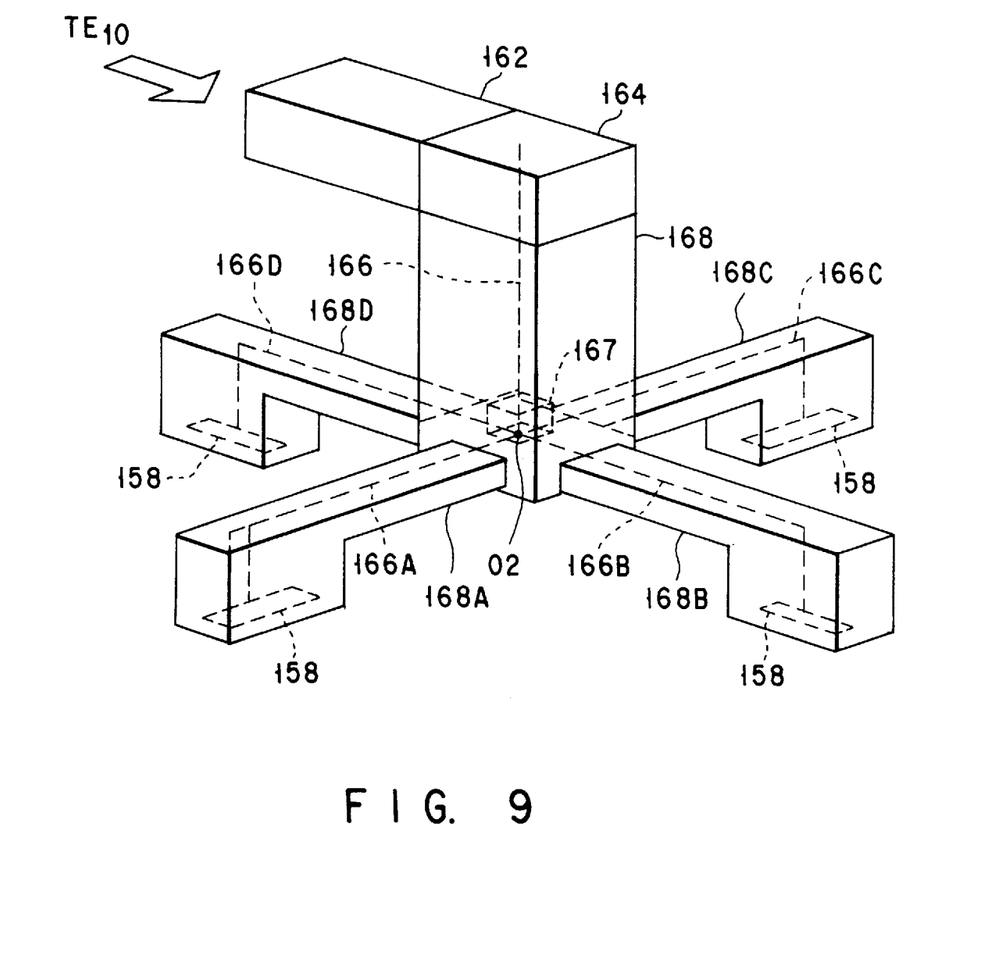
FIG. 9 is a perspective view showing the bonding state of the branched waveguides and the flat antenna of the apparatus shown in FIG. 8.
Figure 10:
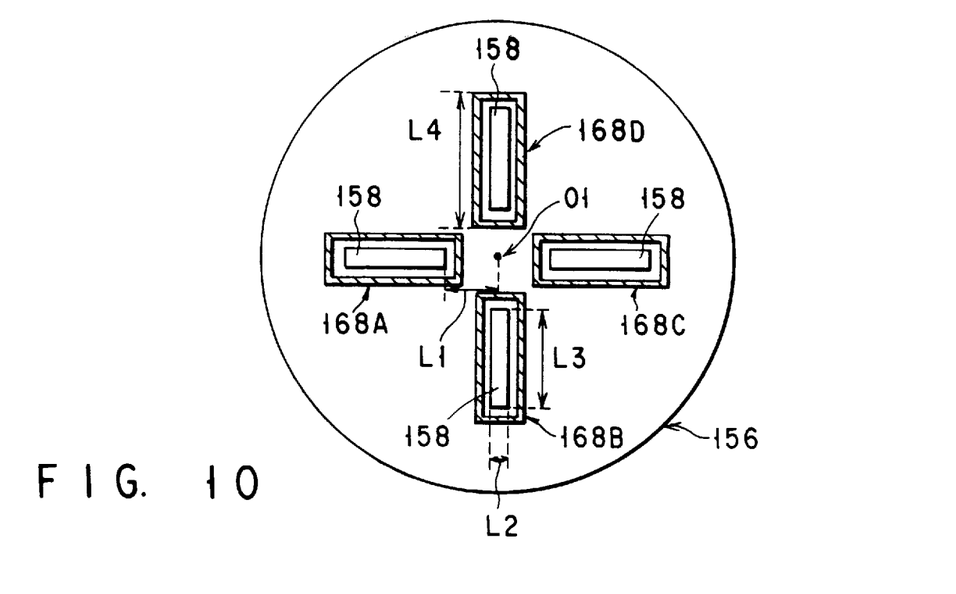
FIG. 10 is a plan view showing the flat antenna of the apparatus shown in FIG. 8.

A disk-like flat antenna 156 is disposed on the outer side of the transmitting window 54 to oppose it to be parallel with it. The antenna 156 is made of a conductor, e.g., copper or aluminum. As shown in FIGS. 9 and 10, the antenna 156 is formed with a plurality of (four in FIGS. 10 and 11) slit-like elongated microwave inlets 158 extending in the radial direction. The four microwave inlets 158 are arranged concentrically and are point symmetric about the center. The distance between the antenna 156 and the transmitting window 54 is preferably set at the length of about the microwave wavelength in the tube.

In order to supply a microwave to the microwave inlets 158, a microwave generator 160 for generating, e.g., a 2.45-GHz microwave, is used. The microwave generated by the microwave generator 160 is transmitted to the antenna 156 through a rectangular waveguide 162 made of a conductor and a coaxial waveguide 168 having a coaxial line 166 in it. The rectangular waveguide 162 and the coaxial waveguide 168 are connected to each other through a mode converter 164 made of a conductor to form an angle of 90°.

The coaxial waveguide 168 is branched into four branched waveguides 168A to 168D midway. The distal ends of the branched waveguides 168A to 168D are connected to the four microwave inlets 158 formed in the antenna 156 to cover them. The coaxial line 166 is also branched into four branched coaxial lines 166A to 166D through an impedance matcher 167. Respective branched coaxial lines 166A to 166D are connected to the antenna 156 through the corresponding branched waveguides 168A to 168D. More specifically, the microwave generated by the microwave generator 160 passes through the rectangular waveguide 162, the coaxial waveguide 168, and the branched waveguides 168A to 168D, and is introduced from the respective slit-like microwave inlets 158 into the processing chamber 16.

The microwave introduced from the microwave inlets 158 into the processing chamber 16 through the transmitting window 54 forms a substantially concentric electric field similar to the $TE_{01}$-mode field to be parallel to the upper surface of the wafer W. A distance L1 between the respective microwave inlets 158 and a central point O1 of the antenna 156 is set such that a strong electric field can be obtained even at the center of the concentric circle.

As shown in FIG. 9, the distances from a branching point O2 of the coaxial waveguide 168 to the corresponding microwave inlets 158 through the respective branched waveguides 168A to 168D are set to be equal. As a result, the respective branched portions of the microwaves introduced from the respective microwave inlets 158 are set to have the same phase at high precision.

For example, when the diameter of the semiconductor wafer W is 12 inches (substantially 30 cm), the diameter of the flat antenna 156 is set at about 20 cm to 30 cm, a width L2 and a length L3 of the slit-like microwave inlets 158 at about 2 mm to 10 mm and at about 40 mm to 80 mm, respectively, and a length L4 of the long side of the coaxial waveguide 168 at about 100 mm, as shown in FIG. 10. These values are merely examples and can be variously changed in accordance with the oscillation state of the microwave.

The operation of the plasma etching apparatus 114 having the above arrangement will be described.

The semiconductor wafer W is transferred into the processing chamber 16 by a transfer arm through the gate valve 46. Lifter pins (not shown) are vertically moved to place the wafer W on the upper surface of the work table 18.

While the interior of the processing chamber 16 is maintained at a predetermined process pressure, e.g., within a range of 0.1 mTorr to several 10 mTorr, an active gas such as $CF_4$ gas and an inert gas such as Ar gas are supplied from the nozzles 32 and 42 under flow rate control. The Ar gas may not be supplied. The microwave generated by the microwave generator 160 is introduced into the plasma generating space S1 and the processing space S through the rectangular waveguide 162, the coaxial waveguide 168, the branched waveguides 168A to 168D, and the antenna 156. An electric field is formed in the spaces S1 and S in this manner to generate a plasma, thereby performing etching. At this time, an electron cyclotron resonance phenomenon is caused by the magnetic field of the magnet 44 arranged on the outer side of the processing chamber 16, and the plasma density increases accordingly.

The microwave of, e.g., 2.45 GHz, generated by the microwave generator 160 is transmitted through the rectangular waveguide 162 in the $TE_{10}$ mode, and is converted into a coaxial mode by the mode converter 164. The microwave which has been transmitted through the coaxial waveguide 168 is branched into four waves at the branching point O2, and the four branched microwaves are transmitted through the branched waveguides 168A to 168D. The branched microwaves are introduced into the plasma generating space S1 through the respective slit-like microwave inlets 158.

Figure 11:
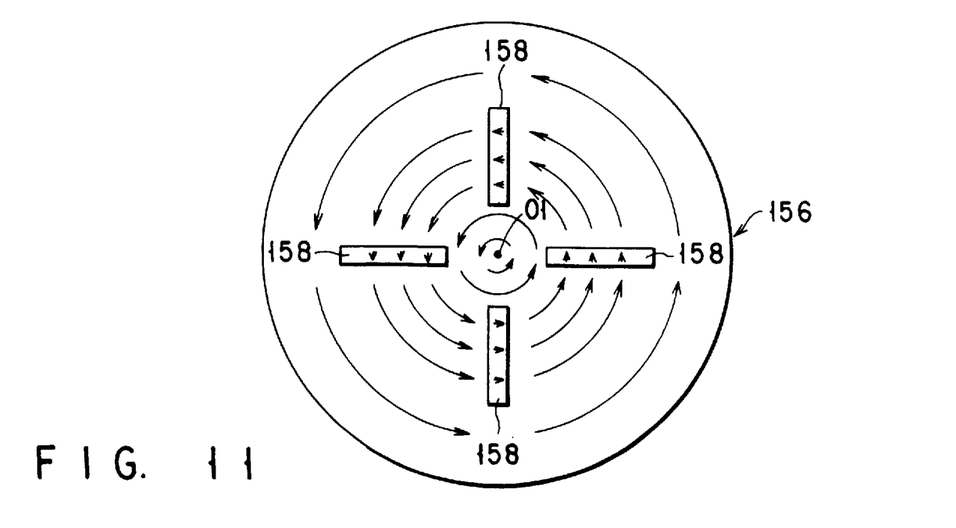
FIG. 11 is a view showing the state at a certain moment of an electric field generated by the flat antenna shown in FIG. 10.

The microwave inlets 158 are formed into slits elongated in the radial direction of the disk-like antenna 156, as shown in FIG. 11, and are arranged to be concentric about a center O1 of the antenna 156. When the branched microwave portions introduced through the microwave inlets 158 are synthesized, a mode similar to the $TE_{01}$ mode is generated, and a substantially concentric alternating electric field uniformed in the circumferential direction of the antenna 156 can be generated to be parallel to the upper surface of the wafer W. Since the distances from the branching point O2 (refer to FIG. 9) of the coaxial waveguide 168 to the respective microwave inlets 158 are set equal, the branched microwave portions introduced through the respective microwave inlets 158 are set to have the same phase precisely. As a result, a substantially uniform electric field can be generated in the circumferential direction.

The field strength tends to drop at the central portion of the antenna 156. If the distances L1 (refer to FIG. 10) between the central point O1 and the respective microwave inlets 158 are set appropriately, this drop in the electric field can be prevented.

Figure 12:
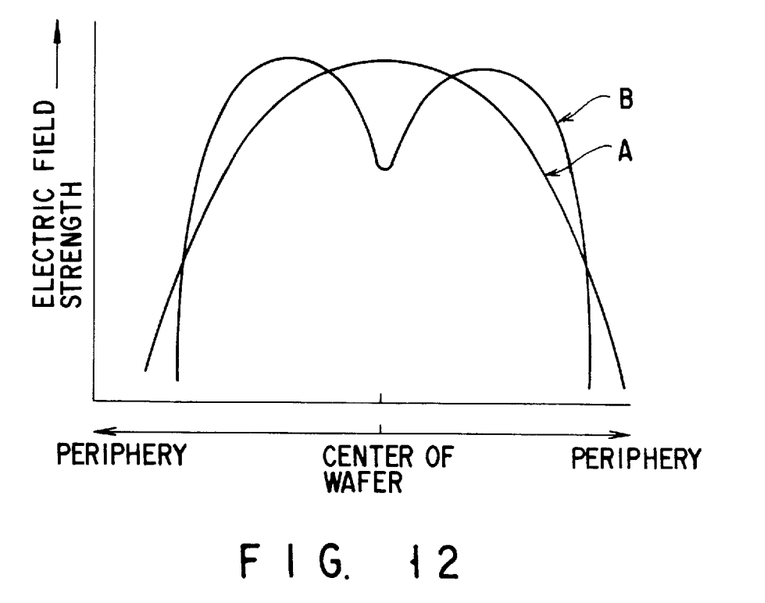
FIG. 12 is a graph showing the distribution of the electric field above a semiconductor wafer in the apparatus shown in FIG. 8.

FIG. 12 shows the electric field strength distribution above the wafer W. In FIG. 12, a curve A indicates the electric field curve of the conventional apparatus, and a curve B indicates the electric field curve of the apparatus of the embodiment shown in FIG. 8. The electric field strength of the curve A of the conventional apparatus gradually decreases nearer the peripheral portion from the central portion of the wafer. In this case, when processing a particularly large wafer, e.g., a 12-inch wafer, a large difference occurs in plasma processing between the central portion and the peripheral portion of the wafer. In contrast to this, in the curve B of the present invention, although the electric field strength slightly decreases at the central portion of the wafer, it does not greatly decrease at the peripheral portion of the wafer. In this case, plasma processing can be performed substantially uniformly within the surface even in a large-sized wafer.

Therefore, according to the plasma etching apparatus shown in FIG. 8, a high-density plasma can be generated substantially uniformly on the entire surface of the wafer, and plasma etching having a high planar uniformity can be performed. When this advantage is applied to an apparatus that performs sputtering film formation by using a plasma, plasma film formation having a high planar uniformity can be similarly performed.

Figure 13:
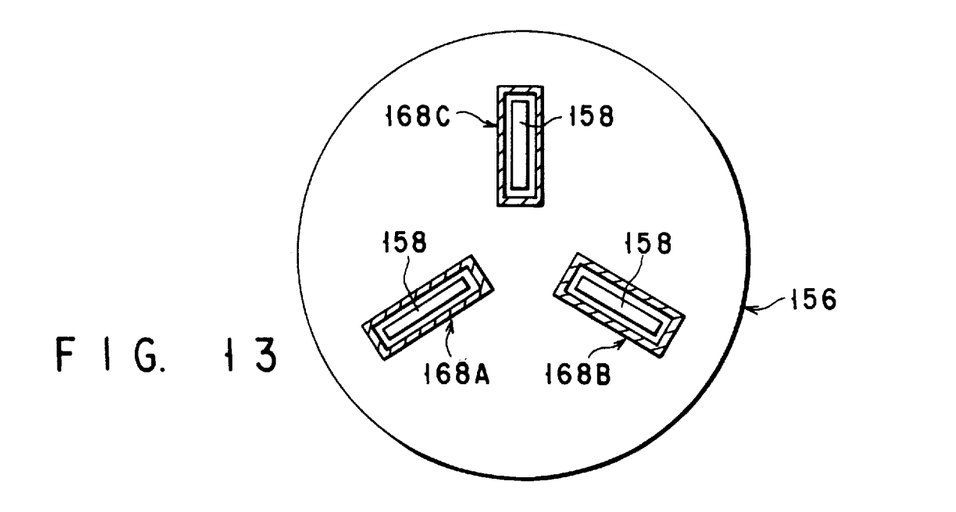
FIG. 13 is a plan view showing a modification of a flat antenna formed with three microwave inlets.

In the apparatus shown in FIG. 8, the four slit-like microwave inlets are formed in the flat antenna 156. However, as far as a substantially concentric electric field can be generated, the number of microwave inlets can be variously changed. For example, in the modification shown in FIG. 13, three microwave inlets 158 are concentrically formed at an equal angular interval of 120°. Alternately, five or more microwave inlets can be formed at an equal angular interval. In the apparatus shown in FIG. 8, the antenna is disposed on the outer side of the processing chamber. However, the antenna may be coated with quartz or the like and be disposed in the processing chamber.

Figure 14:
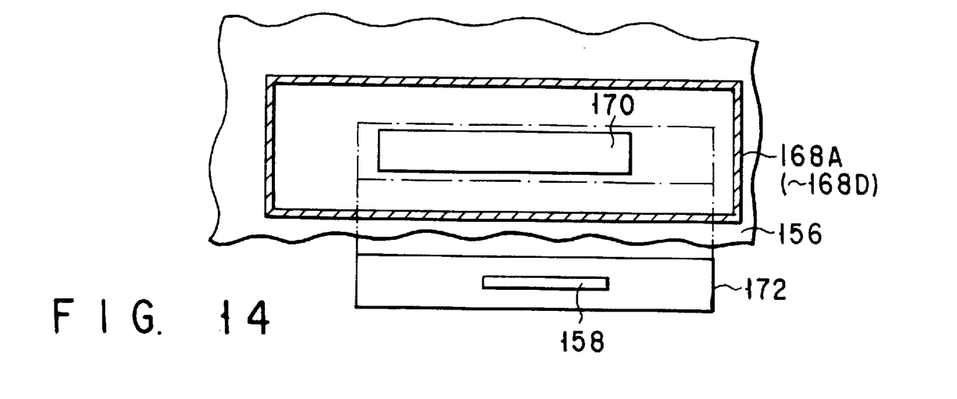
FIG. 14 is an exploded plan view showing a structure that allows the position of the microwave inlet of the flat antenna to be adjustable.
Figure 15:
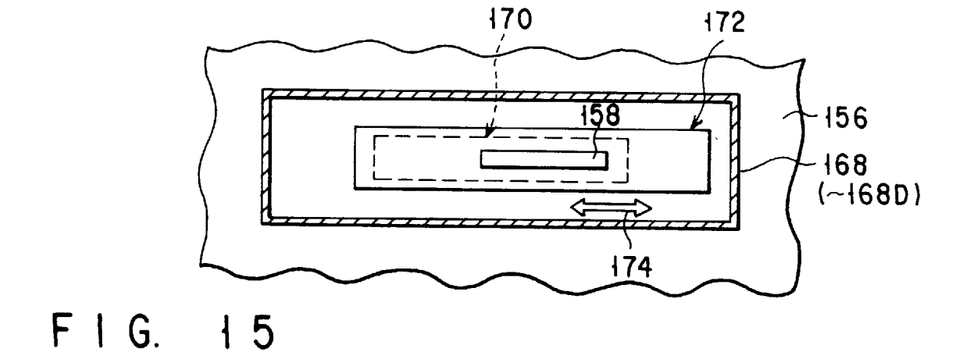
FIG. 15 is a plan view showing a state wherein the structure shown in FIG. 14 is assembled.

As shown in FIGS. 14 and 15, the positions of the respective microwave inlets 158 can be moved in the radial direction of the antenna. Then, the field strength distribution can be adjusted in accordance with the type of the process, so that the plasma density can be set to have the optimum distribution.

FIGS. 14 and 15 are plan views respectively showing the exploded state and the assembled state of a structure that allows the microwave inlet of a flat antenna to be positionally adjustable. As shown in FIGS. 14 and 15, a rectangular auxiliary inlet 170 much larger than the microwave inlets in the longitudinal direction is formed at the attaching portion of the branched waveguide 168A of the flat antenna 156. The auxiliary inlet 170 is covered with a slide plate 172 larger than it and formed of, e.g., a copper plate. The slide plate 172 is formed with a slit-like microwave inlet 158. The slide plate 172 is attached to the antenna 156 to be slidable in the direction indicated by an arrow 174, i.e., in the radial direction of the antenna 156.

When the position of the microwave inlet 158 is made adjustable in the radial direction of the antenna 156 in this manner, the electric field strength distribution can be adjusted in accordance with the type of process. For example, the uniformity in plasma density can be improved by controlling the drop in the electric field of the curve B shown in FIG. 12 at the central portion of the wafer.

According to the embodiment of the present invention described with reference to FIGS. 8 to 15, the following effects can be obtained.

When in-phase microwaves are introduced through the plurality of microwave inlets formed in the flat antenna, a substantially concentric electric field can be generated in the processing chamber, and the plasma density can be uniform over a wide area. As a result, the planar uniformity of plasma processing can be improved. When the microwave inlets are made positionally adjustable in the radial direction, the distribution of a desired plasma density can be obtained to match the type of plasma processing.

The above embodiments have been described by way of plasma etching. However, the present invention can be similarly applied to other plasma processing, e.g., plasma film formation, plasma sputtering, plasma ashing, and the like. As the target object, an LCD substrate, a glass substrate, and the like can be used in addition to a semiconductor wafer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An apparatus for processing a target object by using a plasma, comprising:

an airtight processing chamber;

a work table for supporting the target object disposed in said processing chamber;

an exhaust for exhausting said processing chamber and setting said processing chamber at a vacuum;

a process gas supply for supplying a process gas into said processing chamber; and a microwave supply for supplying into said processing chamber a microwave for exciting the process gas to convert the process gas into a plasma, said microwave supply having a first waveguide connected to a microwave generator, a second waveguide open to face said processing chamber, and a mode converter for connecting said first and second waveguides so as to change an oscillation mode and transmitting direction of the microwave, and said mode converter converting the microwave such that the microwave transmitted through said second waveguide becomes a hybrid wave having two mode waves of oscillation modes that are different from each other, wherein said mode converter has a recessed portion defined by a conductive wall, and being concentric with said second waveguide and open to face said second waveguide through an extension line at a center of said first waveguide, and a distance Ld from the extension line at the center of said first waveguide to an inner end face of said recessed portion is set to satisfy a relation $[\lambda a/4+(\lambda b-\lambda a)/16]<Ld<[\lambda b/4-(\lambda b-\lambda a)/16]$ with respect to respective wavelengths $\lambda a$ and $\lambda b$ of said two mode waves.

2. An apparatus according to claim 1, wherein the distance Ld is set at about $(\lambda a+\lambda b)/8$.

3. An apparatus according to claim 1, wherein said mode converter has an adjusting member for causing said inner end face of said recessed portion to come close to and separate from said second waveguide.

4. An apparatus according to claim 1, further comprising a magnetic field generator for generating a magnetic field in said processing chamber in order to cause electron cyclotron resonance by cooperation with the microwave, wherein both of the two mode waves of the microwave have electric field components substantially perpendicular to the magnetic field.

5. An apparatus according to claim 1, wherein said processing chamber has a microwave transmitting window made of a dielectric, and said second waveguide opens to face said transmitting window.

6. An apparatus according to claim 1, wherein said first and second waveguides are a rectangular waveguide and a circular waveguide, respectively.

7. An apparatus according to claim 6, wherein said circular waveguide has a tapered shape such that a diameter thereof gradually increases toward said processing chamber.

8. An apparatus according to claim 6, wherein said two mode waves are a $TM_{01}$-mode wave and a $TE_{11}$-mode wave, respectively.

9. An apparatus according to claim 8, further comprising a polarizing member disposed in said mode converter or said second waveguide in order to circularly polarize the $TE_{11}$-mode wave.

10. An apparatus according to claim 4, wherein the magnetic field is set to be substantially perpendicular to a surface of the target object.

11. An apparatus according to claim 4, wherein said process gas supply contains an inert gas and an active gas that are supplied from different supply ports, and the inert gas is supplied to a side farther from the target object than the active gas is.

12. An apparatus for processing a target object by using a plasma, comprising:

an airtight processing chamber;

a work table for supporting the target object disposed in said processing chamber;

an exhaust for exhausting said processing chamber and setting said processing chamber at a vacuum;

a process gas supply for supplying a process gas into said processing chamber; and a microwave supply for supplying into said processing chamber a microwave for exciting the process gas to convert the process gas into a plasma, said microwave supply having a main waveguide connected to a microwave generator, a flat antenna disposed to oppose said processing chamber and having a plurality of openings disposed concentrically, and a plurality of branched waveguides for connecting said main waveguide and said openings of said flat antenna to each other, and said microwave being transmitted from said main waveguide to the openings of said flat antenna while being branched through said branched waveguides, and introduced into said processing chamber from the openings such that respective portions of branched microwaves are synthesized, thereby forming a concentric electric field, wherein said branched waveguides are set to have substantially a same length, and said branched waveguides and a portion of said main waveguide connected thereto are made of coaxial waveguides.

13. An apparatus according to claim 12, further comprising an adjusting member for adjusting positions of the openings of said antenna in a radial direction.

14. An apparatus according to claim 12, further comprising a magnetic field generator for generating a magnetic field in said processing chamber in order to cause electron cyclotron resonance by cooperation with the microwave, wherein the concentric electric field and the magnetic field are substantially perpendicular to each other.

15. An apparatus according to claim 12, wherein said processing chamber has a microwave transmitting window made of a dielectric, and said flat antenna is disposed to face said transmitting window.

16. An apparatus according to claim 14, wherein said main waveguide has a rectangular waveguide connected to said microwave generator, and a mode converter for connecting said rectangular waveguide and said coaxial waveguides to change an oscillation mode and transmitting direction of the microwave.

17. An apparatus according to claim 14, wherein the magnetic field is set to be substantially perpendicular to a surface of the target object.

18. An apparatus according to claim 14, wherein said process gas supply contains an inert gas and an active gas that are supplied from different supply ports, and the inert gas is supplied to a side farther from the target object than the active gas is.

19. An apparatus for processing a target object by using a plasma, comprising:

an airtight processing chamber;

a work table for supporting the target object disposed in said processing chamber;

an exhaust for exhausting said processing chamber and setting said processing chamber at a vacuum;

a process gas supply for supplying a process gas into said processing chamber; and a microwave supply for supplying into said processing chamber a microwave for exciting the process gas to convert the process gas into a plasma, said microwave supply having a first waveguide connected to a microwave generator, a second waveguide open to face said processing chamber, and a mode converter for connecting said first and second waveguides so as to change an oscillation mode and transmitting direction of the microwave, and said mode converter converting the microwave such that the microwave transmitted through said second waveguide becomes a hybrid wave having two mode waves of oscillation modes that are different from each other, wherein said first waveguide and said second waveguide are a rectangular waveguide and a circular waveguide, respectively, wherein said two mode waves are a $TM_{01}$-mode wave and a $TE_{11}$-mode wave, respectively, wherein said mode converter has a recessed portion defined by a conductive wall, and being concentric with said second waveguide and open to face said second waveguide through an extension line at a center of said first waveguide, and a distance Ld from the extension line at the center of said first waveguide to an inner end face of said recessed portion is set to satisfy a relation $\lambda a/4 < Ld < \lambda b/4$ with respect to respective wavelengths $\lambda a$ and $\lambda b$ of said two mode waves, and wherein said apparatus further comprises a polarizing member disposed in said mode converter or said second waveguide in order to circularly polarize the $TE_{11}$-mode wave.

20. An apparatus according to claim 19, wherein said circular waveguide has a tapered shape such that a diameter thereof gradually increases toward said processing chamber.

21. An apparatus according to claim 19, further comprising a magnetic field generator for generating a magnetic field in said processing chamber in order to cause electron cyclotron resonance by cooperation with the microwave.

22. An apparatus according to claim 21, wherein the magnetic field is set to be substantially perpendicular to a surface of the target object.

* * * * *